United States Patent [19]

Cory et al.

[11] 4,312,276
[45] Jan. 26, 1982

[54] TURNTABLE JOINING TRACKS WITH LINEAR INDUCTION MOTOR CONTROL

[75] Inventors: Stanley A. Cory, Malibu; Millard G. Black, Santa Ana; Gilbert J. Scholtz, La Puente, all of Calif.

[73] Assignee: Walt Disney Productions, Burbank, Calif.

[21] Appl. No.: 82,692

[22] Filed: Oct. 9, 1979

[51] Int. Cl.³ .............................................. E01B 7/00
[52] U.S. Cl. ..................................... 104/38; 104/292; 246/227
[58] Field of Search ...................... 104/35, 38, 47, 50, 104/292, 130; 246/227, 231, 240

[56] References Cited

U.S. PATENT DOCUMENTS

| | | | |
|---|---|---|---|
| 1,800,722 | 4/1931 | Edson | 104/38 |
| 3,534,688 | 10/1970 | Ernst | 104/35 |
| 4,094,252 | 6/1978 | Pater et al. | 104/38 |

Primary Examiner—Richard A. Bertsch
Attorney, Agent, or Firm—Fulwider, Patton, Rieber, Lee & Utecht

[57] ABSTRACT

A turntable bearing tracks at a switching point in an amusement ride course, or other vehicular path having tracks, utilizes two linear induction motors, one for rotating the turntable and one for latching the turntable at selected rotational positions. The linear induction motors are mounted beneath the turntable and operate with an extremely high degree of reliability.

14 Claims, 9 Drawing Figures

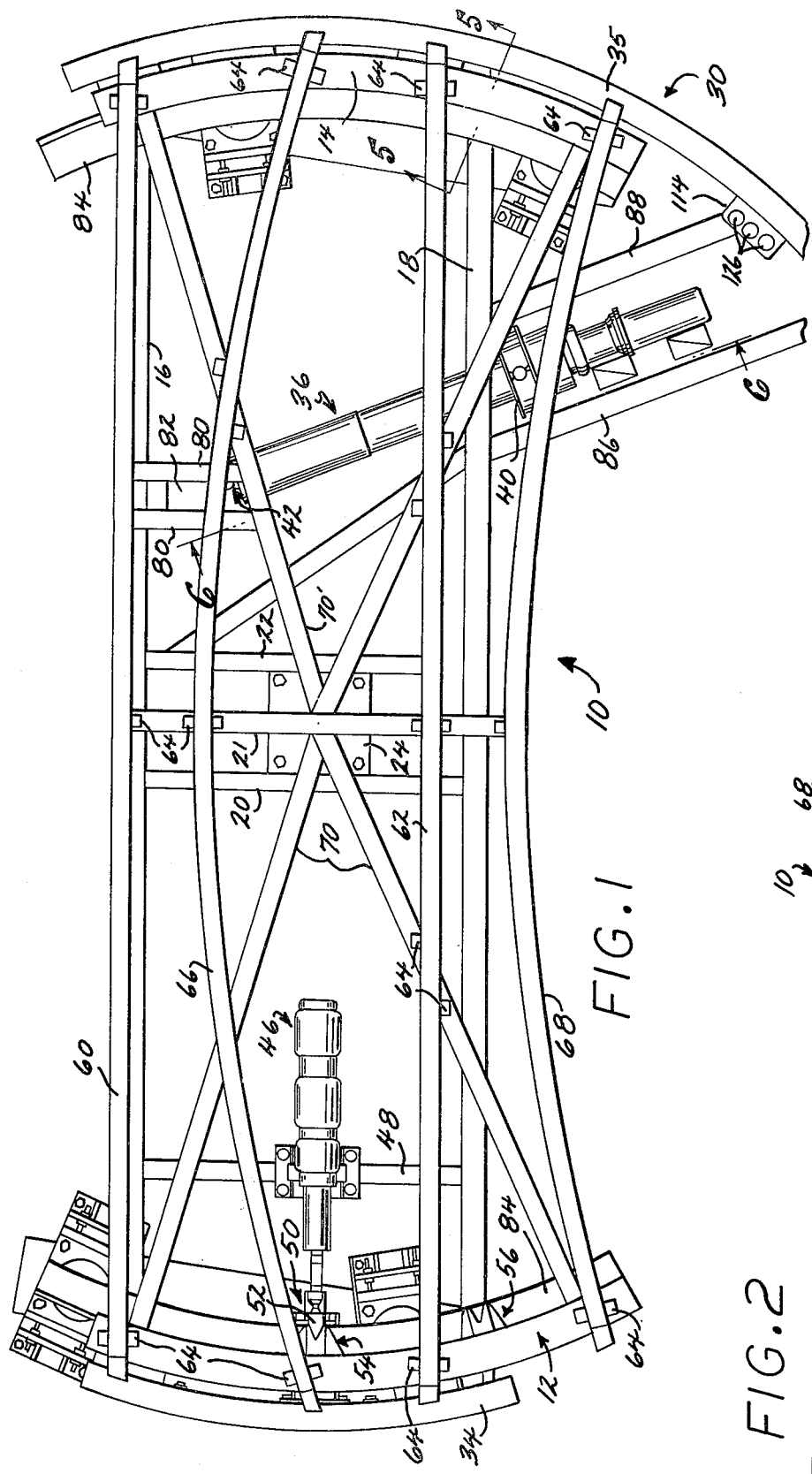
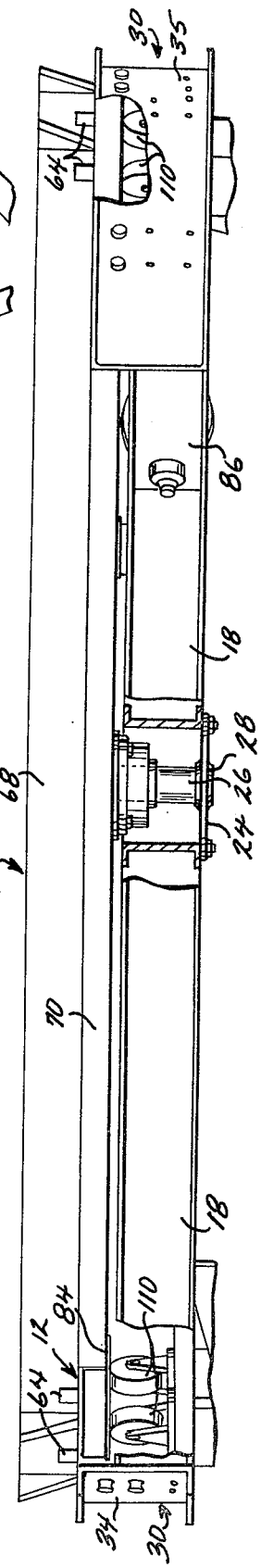
FIG.1
FIG.2

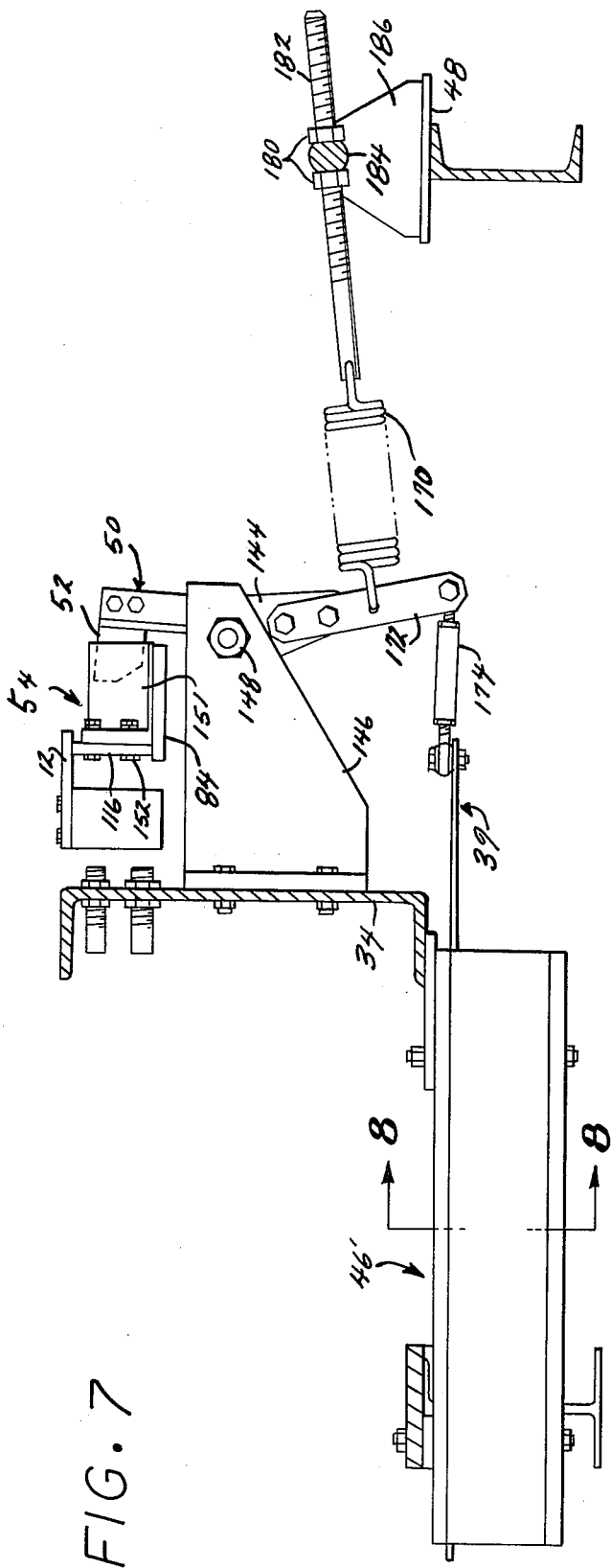
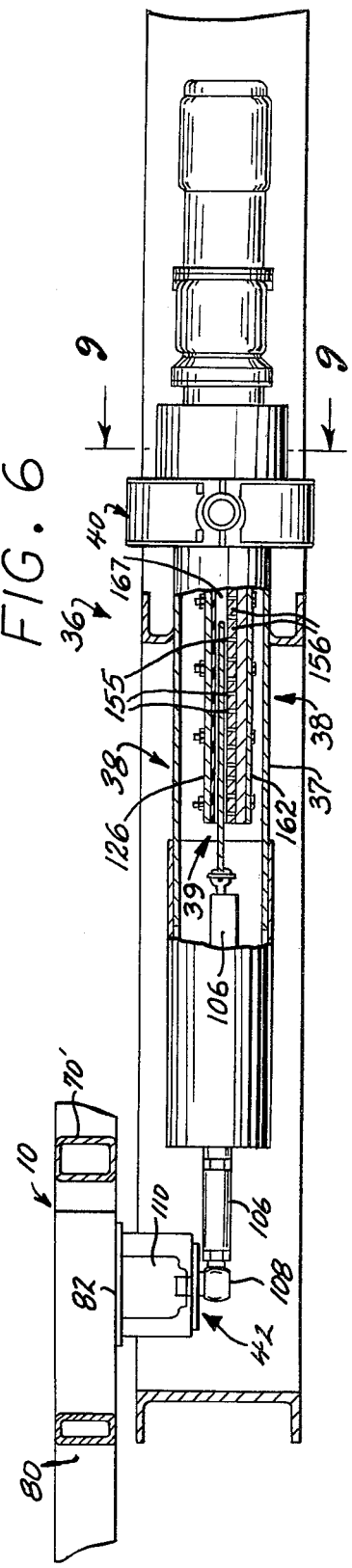
FIG. 7
FIG. 6

TURNTABLE JOINING TRACKS WITH LINEAR INDUCTION MOTOR CONTROL

BACKGROUND OF THE INVENTION

1. Field of the Invention

The present invention relates to railway or trackway switching turntables, especially as used in amusement park ride or transport systems.

2. Description of the Prior Art

Various turntable switching mechanisms have long been employed in connection with track systems for vehicles which are confined to linear rails for movement therealong. Turntables were employed in railway roundhouse switching systems and were used to direct engines and tenders to designated locations along radially aligned track sections from a circular turntable. Such turntables were operated through mechanical gear and linkage system. Through the years more sophisticated turntable controls were developed, but all conventional devices suffer from problems of reliability. The conventional electromechanical devices employing rotating motors, clutches and gear boxes eventually fail to properly drive a turntable in rotation, or to properly stop it and lock it in selected positions of rotational alignment. These defects are aggravated immensely under conditions of high turntable usage, and high speed vehicles, such as are now found in amusement park devices. In modern day amusement parks, turntables for vehicles travelling along tracks are operated literally thousands of time a day. Any failure in rotation, misalignment of the turntable or failure of the turntable to lock properly in a selected position of orientation can lead to serious injury to the vehicle riders. As a consequence, considerable time must be devoted to close scrutiny and preventive maintenance for such devices.

Moreover, where malfunctions occur in conventional turntable control devices, the turntable control is subjected to a considerable liklihood of severe damage. When turntable gears lock up or when clutch mechanisms are forced from their positions of engagement, the turntable control mechanism is frequently rendered inoperable and must be dismantled for repair.

SUMMARY OF THE INVENTION

The present invention involves the use of linear induction motors for operating a turntable mechanism which supports track sections to switch the path of travel of vehicles moving along track rails. One linear induction motor is provided to rotate the turntable and includes stator and armature elements, one of which is attached to a fixed support and the other of which is attached to the turntable. The attachments of the stator and armature is angularly displaced from each other and are radially displaced from the turntable axle, about which the turntable rotates relative to the fixed support. Preferably, one of the attachments is a ball and socket joint while the other attachment includes a yoke which supports one of the relatively movable armature and stator elements to accomodate rotational movement about two perpendicular axes, both orthogonal to the direction of relative longitudinal movement of the stator and armature with respect to each other.

The other linear induction motor is disposed to operate a latch having a bolt which crosses the perimeter of the turntable for receipt by angularly displaced sockets. The bolt is preferably narrowed at its extremity in a wedge-shaped configuration, so that the bolt serves to properly align the turntable as it progresses into the socket. The bolt is preferably connected to the end of a lever that is coupled to the linear induction motor armature to gain a mechanical advantage of movement.

The invention may be described with greater clarity and particularly by reference to the accompanying drawings.

DESCRIPTION OF THE DRAWINGS

FIG. 1 is a plan view showing the turntable of the invention.

FIG. 2 is a side elevational view of the turntable of FIG. 1.

FIG. 6 is an elevational detail partially broken away taken along the lines 6—6 of FIG. 1.

FIG. 7 is a view similar to FIG. 3 showing an alternative embodiment of the invention.

DESCRIPTION OF THE EMBODIMENTS

Figure 3:
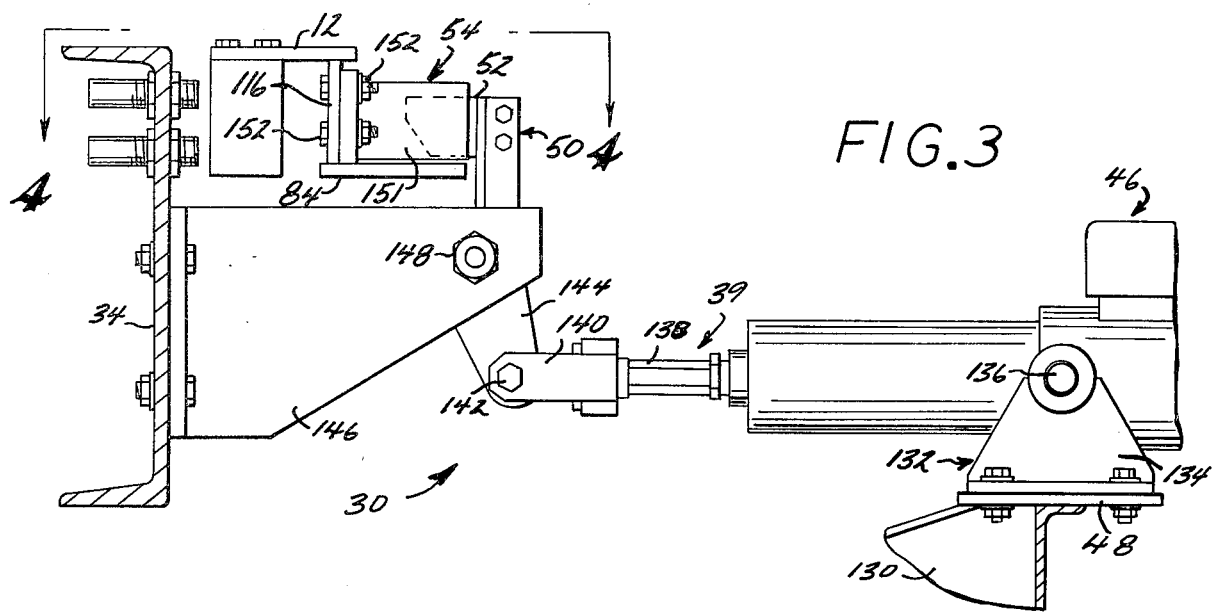
FIG. 3 is a side elevational detail view of the latch mechanism.
Figure 4:
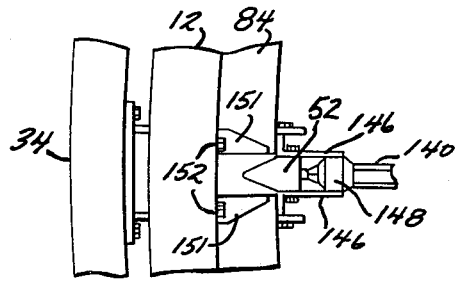
FIG. 4 is a plan detail view taken along the lines 4—4 of FIG. 3.

FIG. 1 illustrates a turntable indicated generally at 10 and including a supporting framework 30 having opposing circular arcuate support channels 34 and 35 on opposite sides of the perimeter thereof. A linear induction motor 36 of generally tubular configuration as depicted in FIG. 6 is mounted beneath the turntable 10 to drive it in alternative directions of rotation as actuated. Another linear induction motor 46 is mounted with its casing secured to the supporting framework 30 and with its armature connected as illustrated in FIGS. 1, 3 and 4 to actuate a latching mechanism 50 which selectively operates a bolt 52 to engage or disengage sockets 54 and 56 spaced along an arcuate interior rim 84 of the turntable 10.

The supporting framework 30 includes longitudinally extending elongated parallel beams 16 and 28 that are arranged in chordal disposition on either side of an axle 26, visible in FIG. 2, to join circular arcuate channels 34 and 35 having outwardly facing flanges as depicted in FIG. 2. The beams 16 and 18 are joined together at their centers by transverse, parallel, channel-shaped cross braces 20 and 22, which are bolted to a flat, square, horizontally disposed bearing plate 24 beneath the center of the turntable 10. The supporting framework 30 includes transverse, horizontally disposed mounting beams 86 and 88 which extend beneath one side of the turntable 10 as illustrated in FIGS. 1 and 2. An elongated transverse mounting plate 48 extends between and is bolted to the underside of the elongated beams 16 and 18 beneath the opposite side of the turntable 10. The mounting plate 48 is supported from beneath by upwardly angled girders 130, as depicted in FIG. 3.

The turntable 10 includes a straight section of track formed by parallel rails 60 and 62 extending between oppositely disposed flat arcuately curved turntable beams 12 and 14. The rails 60 and 62 are secured to the beams 12 and 14 by track mounting pads 64. An alternative section of track is formed by parallel arcuately curved rails 66 and 68, likewise connected to the arcuate turntable beams 12 and 14 by track mounting pads 64, but in displacement from the track section formed by the straight rails 60 and 62. The track sections formed by the rails 60 and 62 on the one hand, and 66 and 68 on the other define alternative paths of movement of a vehicle propelled therealong, such as a cart or a conveyor in an amusement park ride.

The turntable 10 is further braced by elongated, radially directed support beams 70 and 70' emanating from a junction with the axle 26 and joined to extremities of the arcuately curved beams 12 and 14. A transverse cross beam 21 is provided generally perpendicular to the center of the straight rails 60 and 62, and radial at the centers of the arcuate rails 66 and 68, and intersecting the junction of the radial support beams 70 and 70' with the axle 26.

The diagonal beam 70' is connected to the linear rail 60 by means of transverse coupling braces 80, which are connected to the underside of the rail 60 and welded to the diagonal support 70'. The coupling braces 80 carry an angle plate 82 with a downwardly depending leg to which a ball and socket joint 42 is connected, as depicted in FIG. 6.

Figure 5:
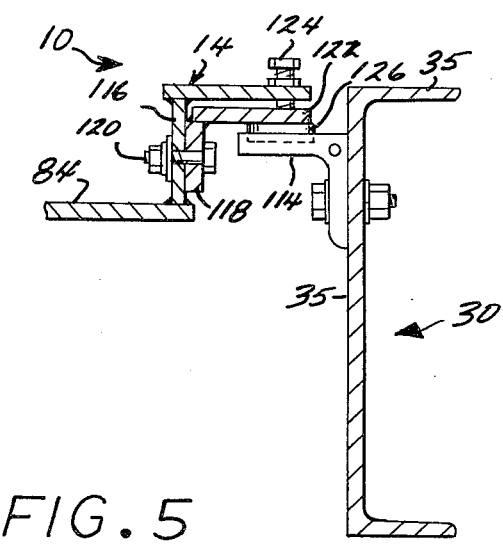
FIG. 5 is a sectional detail taken along the lines 5—5 of FIG. 1.

Beneath the curved beams 12 and 14 at the inner peripheries thereof are welded downwardly depending partition plates 116, depicted in detail in FIG. 5 which are disposed at right angles to the beams 12 and 14. Below the partition plates 116, and extending inwardly therefrom and welded thereto are interior arcuately curved rims 84 which follow the curvature of the turntable beams 12 and 14 to which they are connected to create an outer "Z"-shaped cross section at the perimeter of the turntable 10. On the outside of the partition plates 116 there are positioning plates 118 bolted to the partition plates 116 by connector bolts 120, as depicted in FIG. 5. At the upper extremity of the positioning plates 118, and extending outwardly parallel to and directly beneath the arcuate turntable beams 12 and 14 there are turntable support plates 122 which are deflected downwardly to an adjustable degree by means of adjustment bolts 124. The bolts 24 are threadably engaged in corresponding tapped, threaded apertures in the arcuate turntable beams 12 and 14. The bolts 124 can be utilized to adjust the downward disposition of the cantilevered plates 122. At intervals along the arcuate framework support channels 34 and 35 there are inwardly directed angle brackets 114 that extend beneath the arcuate turntable beams 12 and 14 of the turntable 10.

The plates 122 ride with the movement of the turntable 10 directly beneath the arcuate turntable beams 12 and 14 and aid in preventing the turntable 10 from tipping as a vehicle passes across it. This is achieved by interaction of the plates 122 with disk-shaped abrasion pucks 126 located upon the upper surfaces of the outwardly extending angle brackets 114 mounted upon the framework support channels 34 and 35. A vehicle traversing the turntable 10 can thereby tip to only a very limited degree, as determined by the adjustment of the spacer bolt 124, so that the rail sections 60, 62, 66 and 68 cannot dip below the level of corresponding rails radially disposed from the turntable 10 on the support framework 30.

As illustrated in FIG. 2, the turntable 10 is rotated about its center by a cylindrical axle 26 that is journaled for rotation within a bearing 28 and supported within the fixed supporting framework 30. The turntable 10 rotates relative to the supporting framework 30, and guide rollers 110 located between the longitudinally extending beams 16 and 18 of the supporting framework 30 cooperate with the arcuate inwardly extending rims 84 of the turntable 10 to maintain the turntable 10 in a horizontal disposition.

Figure 8:
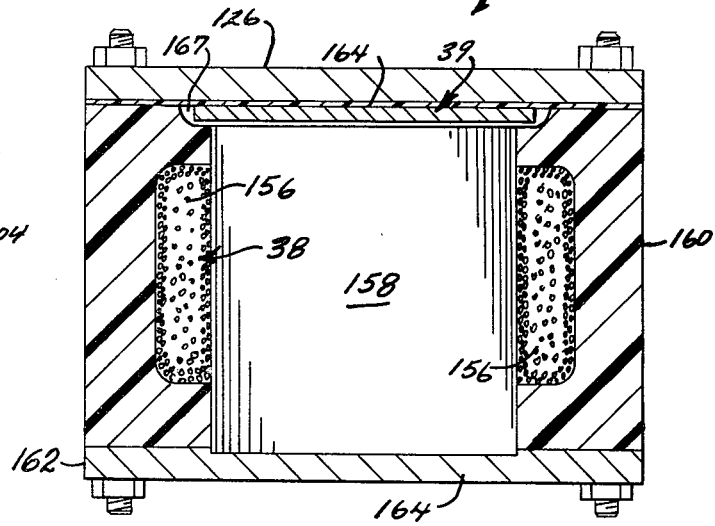
FIG. 8 is a sectional elevational view taken along the lines 8—8 of FIG. 7.

A linear induction motor 36 is located beneath the turntable 10, and has a stator section 38 encompassed within a cylindrical annular housing 37 and an armature section in the form of a flat aluminum and steel plate 39 of the type depicted in FIG. 8, reciprocally disposed therewithin. The stator 38 is attached to the supporting framework 30 at a support attachment by means of a yoke assembly 40, depicted in detail in FIG. 9, while a push-rod 106, connected to the armature 39 is attached at a turntable attachment by means of a ball and socket joint 42 to the underside of the turntable 10, as depicted in FIG. 6. The yoke 40 and ball and socket joint 42 are radially displaced from the axle 26 and are annularly displaced from each other, as depicted in FIG. 1.

Figure 9:
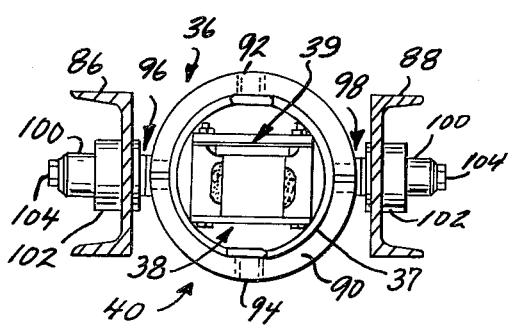
FIG. 9 is a sectional elevational view taken along the lines 9—9 of FIG. 6.

The linear induction motor 36 is mounted between the channels 86 and 88 by the support attachment yoke 40, depicted in detail in FIG. 9. The attachment yoke 40 includes an annular ring 90 which encircles the housing of the stator 38 of the linear induction motor 36 and is connected to the housing by journaled connections 92 and 94, which allow the stator 38 to swivel horizontally about a vertical axis to a limited degree. Perpendicular thereto are journaled bearing connections 96 and 98 which connect the annular ring 90 to the mounting channels 86 and 88 and which allow the annular mounting ring 90 to rotate about a horizontal axis passing through the journaled connections 96 and 98 perpendicular to the axis between the connections 92 and 94. The journaled connections 96 and 98 include pivot spindles which are secured by spindle clamps 100 which are disposed within spindle sleeves 102 and locked in place by nuts 104. With the yoke attachment 40 of FIG. 9, the stator 38 of the linear induction motor 36 is able to move relative to the supporting framework 30 about the two perpendicular axes, passing, respectively, between the journals 96 and 98 and the journals 92 and 94. These two axes are both orthogonal to the direction of radial movement of the bolt 52 of the latching mechanism 50 which is coincident with the alignment of the stator 38, as depicted in FIG. 6.

The armature 39 of the linear induction motor 36 is connected to a push-rod 106 which extends beyond the linear induction motor housing, depicted in FIG. 6, and terminates in a socket 108 of the ball and socket joint 42. The depending leg of the downwardly extending angle plate 82, attached to the cross braces 80, carries an internally threaded boss 110 which receives the threaded shank attached to a ball carried in the socket 108.

Attachment of the linear induction motor 36 to the supporting framework 30 and the turntable 10 in the manner depicted in FIGS. 6 and 9 allows the linear induction motor 36 to accomodate any transverse movement of the turntable 10 relative to the attachment yoke 40 as the turntable 10 rotates about the axle 26 relative to the support framework 30. The armature 39 is thereby able to easily slide longitudinally relative to the stator 38 without any physical linkage thereto within the armature race 167, and thus avoid any tendency for this movement to be restricted or for binding to occur.

Another linear induction motor 46 of essentially the same operative construction as the linear induction motor 36, but of smaller dimensions is mounted on the transverse mounting plate 48 of the supporting framework 30 between the elongated parallel beams 16 and 18. The linear induction motor 46 operates a latch 50, including a bolt 52 (FIG. 4) to selectively reciprocate the bolt 52 relative to alternative wedge-shaped sockets 54 and 56 disposed on one of the arcuate rim sections 84 of the turntable 10. The radial extremity of the latching linear induction motor 46 is depicted in FIG. 3. The linear induction motor 46 is supported within a U-shaped cradle 132 having triangular shaped upstanding ears 134. At the apices of the ears 134 the housing of the lim 46 is carried in rotation about a horizontal axial rod 136 parallel to the disposition of the transverse mounting pad 48. The lim 46 can thereby rock fore and aft within the cradle 132.

The radial extremity of the armature 39 of the lim 46 is directed outwardly and joined to a push rod 138 which terminates in a U-shaped bracket 140. The bracket 140 is rotatably connected at an axle rod bolt 142 to a bell crank or lever 144 which is mounted between a pair of angle brackets 146 bolted to and extending inwardly from the arcuate support channel 34. The bell crank 144 is rotatable about a horizontal fulcrum bolt 148 between the brackets 146. At the upper extremity of the bell crank 144 there is a radially outwardly tooth or bolt 52, of wedge-shaped configuration tapered nearly to a point as indicated in FIG. 4.

As indicated in FIG. 1, two different sockets 54 and 56 are mounted upon the arcuate rim 84 at the turntable beam 12 of the turntable 10. The sockets 54 and 56 are each formed by a pair of oppositely disposed angle brackets 151 which are bolted to the partition plate 116 by bolts 152. The span between the opposing angle brackets 151 defines the sockets 54 and 56. The bolt 52, which is tapered to a narrow extremity as depicted in FIG. 4, can thereby be driven between the angle brackets 151 into either of the sockets 54 or 56 with which the latch 50 is aligned.

By operating the bolt 52 of the latch 50 by means of the bell crank 144, any desired mechanical advantage in movement of the bolt 52 responsive to movement of the armature 39 of the linear induction motor 46 may be obtained. That is, a longer strike of the bolt 52 may be produced by shortening the distance between the axle rod bolt 142 and the fulcrum bolt 148, depicted in FIG. 3.

An alternative linear induction motor controlled latching arrangement is depicted in FIG. 7. In the embodiment of FIG. 7, a spring 170 is provided to spring bias the latch bolt 52 into either the socket 54 or the socket 56, whichever is aligned therewith, with a force of preferably about 100 pounds. The bell crank 144 is provided with an extension link 172, rigidly bolted to the bell crank 144. The armature 39 of the linear induction motor 46' in the embodiment of FIG. 7 is connected by a coupling link 174 to the extension link 172. Upon energization of the linear induction motor 46', the armature 39, is drawn inwardly toward the left, in the embodiment as viewed in FIG. 7. The overcomes the bias of the spring 170 and rotates the bolt 52 out of engagement with the socket 54. The linear induction motor 36 can then be actuated to rotate the turntable 10 to bring the bolt 52 into radial alignment with the socket 56. The driving signal on the linear induction motor 46' is released, so that the spring 170 carries the bolt 52 in counterclockwise rotation into the socket 56. The spring bias of the spring 170 can be adjusted by movement of positioning nuts 180 along the length of a threaded shank 182 to alter the disposition of a follower or keeper nut 184 located thereon and connected to the mounting plate 48 by a angle bracket 186, as depicted.

The construction of the linear induction motor 46' is depicted in FIG. 8, although it is to be understood that the linear induction motors 36 and 46 are constructed functionally the same. With reference to FIGS. 6 and 8, the linear induction motors 36 and 46' include a stator 38 comprised of stator coils 156 positioned on either side of a central lamination stack 158 and potted in epoxy 160. Steel clamping plates 126 and 162 are used to sandwich the potted coils 156 therebetween. A telfon liner 164 is provided adjacent to the armature race 167 within which the armature 39 travels in longitudinally reciprocal fashion. The armature 39 itself is constructed of either of brass or of aluminum backed with steel.

One appropriate type of linear induction motor which may be utilized for either the linear induction motor 46 or 46' or the linear induction motor 36 is a lim type LT 19.5/3/840 manufactured by Lim-Tech Systems Inc. of Santa Monica, Calif. Such a device has a strator stack 158 which is 19.5 inches long and 3 inches wide having 26 slots with 27 teeth 155. Each slot is 0.4 inches in width and 1.375 inches in depth. The coils 156 are formed of number 15 diameter copper wire and driven by three phase, 60 hertz current. The armature 39 can be 12 inches wide and formed of a thickness of 0.125 inches of aluminum and 0.125 inches of iron with a 0.125 inch gap.

The linear induction motor 36 is a bidirectional device. That is, the armature 39 can be driven in either direction. The linear induction motor 46 may be of the same construction, although in the alternative configuration of FIG. 7 the armature 39 of the linear induction motor 46' is driven in but a single direction, and the bolt 52 of the latch 50 is returned to a home position by the spring 170 and engaged in the socket 54 or 56 as in the embodiment depicted in FIG. 7.

In the operation of the invention with either embodiment, a driving signal is first provided to the lim 46 or 46' to withdraw the bolt 52 of the latch 50 from the socket 54 or 56 in which it is seated. The lim 36 is then driven by a separate electrical driving signal so that the stator 38 exerts an electromotive force upon the armature 39. The armature 39 is thereby forced by the stator 38 either to the left or to the right in the armature race 167 relative to the stator 38, as depicted in FIG. 6. The armature 39 of the lim 36 drives the push rod 106, depicted in FIG. 6, to act through the ball and socket joint 42 to rotate the turntable 10 either clockwise, or counterclockwise relative to the fixed supporting framework 30, as viewed in FIG. 1. The ball and socket joint 42 and the yoke assembly 40, depicted in detail in FIG. 9, accomodate the transverse movement of the outwardly extended extremity of the push rod 106 relative to the attachment of the lim 36 to the supporting framework 30 at the transverse mounting beams 86 and 88.

When the turntable 10 has rotated to a new position, the lim 46 and 46' is either actuated, or released, depending upon whether the embodiment of FIG. 3 or that of FIG. 7 is employed. If the embodiment of FIG. 3 is employed, the armature 39 of the lim 46 is pulled inward, thus driving the wedge shaped bolt 52 into the socket formed between the angle brackets 151, illustrated in FIG. 4. It can be seen that even if there is some slight misalignment of the bolt 52 with the socket 54 or 56, the wedge-shaped configuration of the bolt 52 will automatically compensate for any such misalignment, and will shift the turntable 10 slightly in rotation. The bolt 52 thereby varies the angular disposition of the turntable 10 as required.

The invention operates similarly when employing the embodiment of FIG. 7 with the exception that the lim 46' is initially actuated to draw the armature 39 toward the left in FIG. 7. The armature 39 thereby operates through the coupling link 174 to pull the extension link 172 and bell crank 144 clockwise about the fulcrum bolt 148. This withdraws the bolt 52 from the socket 54 or 56. The lim 36 is then actuated to rotate the turntable 10 in either a counterclockwise or clockwise direction, depending upon the direction in which the armature 39 of the lim 36 is moved relative to the stator 38 thereof. During the entire time that the lim 36 is actuated, the lim 46' remains actuated to overcome the spring bias of the spring 170 and hold the bolt 52 in a retracted position in clockwise rotation and out of the interface between the interior perimeter of the turntable 10 and the supporting framework 30 as the turntable 10 rotates. Once the turntable 10 has reached the desired position, the lim 36 is deactuated, which in turn causes deactuation of the lim 46'. The spring 170 then pulls the coupling link 172 and bell crank 144 counterclockwise about the fulcrum bolt 148 thereby driving the bolt 52 into the socket 54 or 56 with which it is aligned. Any minor misalignment is corrected since the interaction between the wedge-shaped nose of the bolt 52 with the angle brackets 151 defining the sockets 54 and 56 will automatically center the socket, and hence the turntable 10, relative to the supporting framework 30.

It may well be desirable for the lims 36 and 46, and the lim 36 in particular, to be equipped with a speed control. A speed control employing an optical sensor in conjunction with a lim control system is described in U.S. Pat. No 3,974,778, and can be adapted for this purpose. Such a means limits the speed of relative movement of the armature 39 and stator 38. Ordinarily, a lim of the type described can develop a speed of 22½ feet per second. However, employing the speed control system described in the aforesaid U.S. Pat. No. 3,974,778, a feedback is provided to the phase control circuitry to limit the power output to the lim. The lim will therefore develop a maximum relative speed between the armature and stator of only four or five feet per second. This aids in preventing the turntable 10 from overshooting its target at the sockets 54 and 56.

The linear induction motors employed to drive the turntable 10 in rotation, and to operate the latching mechanism 50 according to the invention, control the movement of the turntable 10 relative to the supporting framework 30 without any rigid physical connection through the actuating mechanism. That is, the armature 39 is not mechanically linked to the stator 38 in the linear induction motor drive system. This imparts a very high degree of durability and reliability to the drive mechanism. If for any reason the latching mechanism 50 does not lock up completely as desired, the electrical field of the linear induction motors would "slip", but no damage would result. If this failure was neglected, eventually the temperature rise of the lim would signal a shut off condition to the control center, and the system would shut down, but still no damage would result to the lim 36 and 46.

The thrust developed by the lims 36 and 46 can easily achieve 150 pounds, which is quite adequate for latching turntables in an amumsement ride device. If desired, this 150 pound thrust can be added to the 100 force exerted by the spring 170 in the embodiment of FIG. 7. Also, the force can be multiplied by increasing mechanical advantage of the bell crank 144 in the manner previously described.

The linear induction motor drive system of the invention is extremely reliable and is completely weatherproof if encapsulated as depicted. The linear induction motors can be provided at very low cost, they are quite fast acting and are of adjustable thrust capability. This adjustment is provided by alteration of the electrical driving signal to the stator 38. Moreover, since the control is impervious to water, if encapsulated, it can be used underwater to operate a track turntable control.

Undoubtedly numerous variations and modifications of the invention will become readily apparent to those familiar with turntable switching arrangements for amusement park rides and other vehicle pathways in which vehicles are closely constrained in their longitudinal movement by guides. Accordingly, the scope of the invention should not be construed as limited to the specific embodiment depicted herein, but rather is defined in the claims appended hereto.

We claim:

1. A turntable mechanism comprising a fixed support, a turntable mounted by an axle upon said fixed support and rotatable relative to said fixed support in alternative angularly displaced positions, a bi-directional linear induction motor coupled to said turntable and to said fixed support and having a stator element and also an armature element which is linearly movable relative to said stator element in both of two opposite linear directions, and a first of said linear induction motor elements is connected to said fixed support at a support attachment radially displaced from said axle and a second of said linear induction motor elements is connected to said turntable at a turntable attachment radially displaced from said axle and angularly displaced from said support attachment, whereby said linear induction motor is actuable to rotate said turntable in either direction of rotation relative to said fixed support.

2. A turntable mechanism according to claim 1 further characterized in that at least one of said attachments is a ball and socket joint.

3. A turntable mechanism according to claim 1 further characterized in that at least one of said attachments comprises a yoke supporting one of said linear induction motor elements for rotation about two perpendicular axes both orthogonal to the direction of relative movement of said armature and stator elements.

4. A turntable mechanism according to claim 1, further characterized in that said linear induction motor includes a speed control for limiting the speed of relative movement between said armature and stator elements.

5. A mechanism according to claim 1 in that said turntable has a perimeter including a circular arcuate portion and further comprising a latch mounted to move radially relative to said axle of said turntable, a latching linear induction motor mounted upon one of said turntable and fixed support and having relatively movable latch stator and latch armature elements selectively operably connected to reciprocate said latch, a plurality of sockets defined in the other of said turntable and fixed support and located at angularly spaced locations relative to said axle of said turntable to receive said latch, and said latching linear induction motor responds to a latch motor driving signal to selectively move said latch armature element relative to said latch stator element.

6. A mechanism according to claim 5 further characterized in that said latch includes a bolt tapered to a narrow extremity.

7. A mechanism according to claim 6 further characterized in that said latch includes a bolt adapted to be received in said sockets and a lever mounted about a fulcrum on said one of said turntable and fixed support and connected to said latch armature and to said bolt to obtain a mechanical advantage in movement of said bolt responsive to movement of said latch armature.

8. A mechanism according to claim 6 further comprising a cradle supporting said latch stator element relative to said one of said turntable and fixed support for rotational movement about an axis perpendicular to the direction of radial movement of said latch.

9. A mechanism according to claim 5 wherein said latching linear induction motor drives said latch armature element relative to said latch stator element in a single radial direction, and further comprising a spring coupled to bias said latch armature element relative to said latch stator element in the opposite radial direction.

10. In a turntable mechanism, having a fixed support member, and a turntable member which has a perimeter including a circular, arcuate portion and which is mounted by an axle for rotation upon said fixed support member between alternative locked positions, the improvement comprising a linear induction motor having a stator element and an armature element linearly displaceable relative to said stator element, and said stator element is mounted upon a first of said fixed support and turntable members and said armature element is operably connected to radially move a latch relative to said axle, and a plurality of sockets are defined in a second of said fixed support and turntable members and located at angularly spaced positions relative to said axle to receive said latch.

11. An improved turntable mechanism according to claim 10 in which said latch includes a bolt tapered to a narrow extremity.

12. An improved turntable mechanism according to claim 10 in which said latch includes a bolt adapted to be received in said socket and a lever mounted about a fulcrum on said first member and connected to said armature and to said bolt to obtain a mechanical advantage in movement of said bolt responsive to movement of said armature.

13. An improved turntable mechanism according to claim 10 further comprising a cradle supporting said stator element relative to said first member for rotational movement about an axis perpendicular to the direction of radial movement of said latch.

14. An improved turntable mechanism according to claim 10 in which said linear induction motor drives said armature element relative to said stator element in a single radial direction, and further comprising a spring coupled to bias said latch in the opposite radial direction.

* * * * *